June 28, 1960 P. C. PAINTER 2,942,722
BAR CONVEYOR WITH POCKETS
Filed Nov. 29, 1957

INVENTOR.
PETER C. PAINTER
BY Christie, Parker & Hale
ATTORNEYS

United States Patent Office 2,942,722
Patented June 28, 1960

2,942,722
BAR CONVEYOR WITH POCKETS

Peter C. Painter, Bakersfield, Calif., assignor to Painter Manufacturing Company, Bakersfield, Calif., a partnership Filed Nov. 29, 1957, Ser. No. 699,572

1 Claim. (Cl. 198—195)

The invention relates to bar conveyors and particularly to those of the endless type, in which a series of bars spaced side by side are mounted on and extend between concentric rotatable toothed sprockets spaced from each other along their axis of rotation. The invention provides simple means by which pockets are formed in the conveyor and finds application in a variety of equipment, such as movable grizzlies and vegetable digging machines in which the bar conveyors are employed as screens.

It is often desirable to operate conveyors for the purpose of elevating objects from one level to another. This is done by elevating one of the sprocket pairs over which the conveyor runs so that the path of the conveyor extends upwardly from one sprocket pair to the next. However, in the conventional conveyor the slope or angle of elevation is limited by the ability of the particular conveyor to retain the objects being lifted. Particular difficulty is encountered when the objects being conveyed approximate spheroids, for such objects tend to roll down even a relatively slight slope. Various expedients have been proposed to solve this difficulty. These include so-called flight bars which extend transversely across the conveyor at intervals along its length. The flight bars operate to impede downwardly rolling objects. However, such flight bars also tend to impede progress of the conveyor about the sprockets, increase the weight of the structure, and are expensive to install.

I have invented improvements in bar conveyors which increase the ability of conveyors to lift objects to higher levels and which do not detract from the operation of the conveyor as a screen. In a conveyor moving between spaced suspension points in a median plane and having a multiplicity of spaced transverse bar members the invention contemplates the combination comprising a plurality of first bar members in which each member has a conveying portion lying substantially in the median plane, and a plurality of second bar members each having a conveying portion displaced with respect to the median plane. The conveyor may have a plurality of third bar members each having a conveying portion displaced oppositely from the second bar member. The first and second bar members are disposed so that each of the first bar members lies adjacent a second bar member. Preferably second and third bar members lie on either side of the first bar member.

The amount of depression or elevation of the conveyor portion of each bar member with respect to the median plane preferably increases with the displacement of the bar member from the first bar member so that a pocket is formed in which the first bar members also define a median plane with respect to the depth of the pocket.

The conveying portion of each of the first, second and third bar members is centrally located with respect to the width of the conveyor. Preferably the bar members of the conveyor are made from cylindrical rods. These rods are easily deformed at the time of manufacture. Therefore, it is economically possible to form the bars to the desired depression or elevation prior to the assembly of the bar members into a conveyor length.

The invention is most applicable to a looped conveyor which has a set of concentric rotatable toothed sprockets spaced from each other along their axis of rotation. Each of the bar members of such a conveyor extends across the conveyor and is adapted to rest near its end between teeth on the sprocket as the conveyor advances. Each bar member preferably is provided with hooks near both of its ends with the hooks projecting along the line of conveyor movement. The hooks on each member hook over the bar of the member immediately behind it on the conveyor, for example, as described in Patent No. 2,776,045 issued to Samuel J. Heinrichs on January 1, 1957. The spacing on such a conveyor is readily changed.

When the invention is applied to such a conveyor, the spacing between the bar members may be altered and the number of second and third bar members comprising each plurality on either side of the first bar members may be changed to adapt the conveyor to varying conditions.

These and further advantages of the invention are apparent in the following detailed description and drawing, in which.

In the apparatus illustrated by the drawings, a pair of sprockets 10 support an endless bar conveyor 11. The balance of the loop of the endless conveyor is not shown nor are the supporting sprockets at the other end of the loop.

Figure 1:
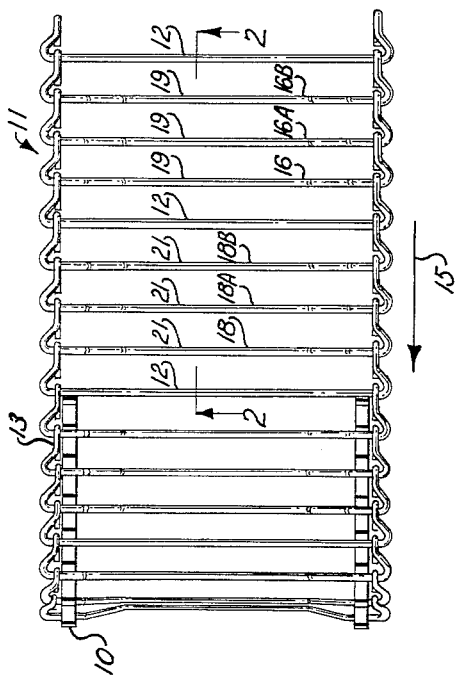
Fig. 1 is a plan view of a preferred embodiment of the invention.

The conveyor comprises a plurality of first bar members 12 which extend between the sprockets of the pair and ride on them in the notches between teeth as the sprockets are rotated. The first bar members extend slightly beyond the sprockets at each side and are then bent inward and backward as viewed in Fig. 1 to form hooks 13 which trail the bars. The direction of conveyor travel is indicated by an arrow 15 in Fig. 1. The orientation of the various bar members is described with respect to conveyor travel in this direction, although reverse travel is entirely consistent with the inventive concept. The ends of the hooks on the bar members are parallel to the outside faces of the respective sprockets and near these faces.

Each of the first bar members 12 lies between a plurality of second bar members 16, 16A, 16B, and a plurality of third bar members 18, 18A, 18B. Each of the second bar members has a depressed conveying portion 19 and each of the third bar members has an elevated conveying portion 21. The conveying portion of each bar member extends substantially from side to side of the conveyor.

Figure 2:
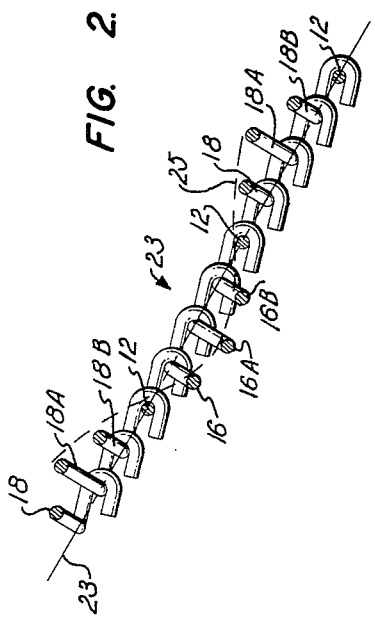
Fig. 2 is a sectional elevation taken along line 2—2 of Fig. 1.

The amount of depression of the plurality of second bar members as measured from a median conveyor plane defined by the first bar members may vary with the distance of the second bar member from the first bar member. For instance, in Fig. 2, the second bar members 16 and 16B have a lesser amount of depression from median plane 23 than does the second bar member 16A. In analogous fashion the third bar member 18A has a higher conveying portion than do comparable third bar members 18 and 18B. A conveyor pocket whose profile is indicated by broken line 25 thus extends from between spaced third bar members of greatest elevation with respect to the median plane of the conveyor.

A multiplicity of pockets may thus be formed in any bar conveyor. The tendency of conveyed objects to tumble down a conveyor which has one elevated end is lessened by the pocket. The pockets are a part of the conveyor and do not require that any extraneous material be added to the conveyor. The conveying portion and the hooks of each bar member may be formed at the same time when the bar member is manufactured by conventional bending methods.

The number of bar members having depressed conveying portions or elevated conveying portions may be altered to meet the requirements of the conveyor. The space between bars is of course dependent in the preferred embodiment upon the amount that the hooked ends trail the bar portion proper. The profile configuration of the pocket may therefore be changed either by the amount of depression or elevation when the bars are first formed or by the spacing of adjacent bar members.

The invention provides a bar conveyor capable of lifting objects at a steeper angle than is possible with conventional conveyors and does this without imposing additional weight or apparatus on the conveyor. The pockets formed in the conveyor by the invention do not impede its progress around the drive or driven sprockets of the conveyor nor do they interfere with the screening function of the bar conveyor.

I claim:

In a conveyor moving between spaced suspension means along a median plane and having a multiplicity of linked transverse bar members spaced along the sides of the conveyor, the combination comprising a plurality of laterally spaced substantially straight first bar members each having a conveying portion lying substantially in the median plane, a plurality of second bar members each having a conveying portion depressed with respect to the median plane, and a plurality of third bar members each having a conveying portion elevated with respect to the median plane, at least three second bar members disposed in every other space between the first bar members and at least three third bar members disposed in the remaining spaces between the first bar members, the distance of each second and third bar member from the median plane increasing with distance from the nearer adjacent first bar.

References Cited in the file of this patent

UNITED STATES PATENTS

| | | |
|---|---|---|
| 907,364 | Hoover | Dec. 22, 1908 |
| 1,314,270 | Kendall | Aug. 26, 1919 |
| 2,077,941 | Leonard | Apr. 20, 1937 |